(12) United States Patent
Popescu et al.

(10) Patent No.: US 6,181,412 B1
(45) Date of Patent: Jan. 30, 2001

(54) INCOHERENT DOPPLER LASER DETECTION AND RANGING SYSTEM

(75) Inventors: Alexandru Florin Popescu, Lisse (NL); Peter Johannes Winzer, Vienna (AT)

(73) Assignee: Agence Spatiale Europeene, Paris (FR)

( * ) Notice: Under 35 U.S.C. 154(b), the term of this patent shall be extended for 0 days.

(21) Appl. No.: 09/335,912

(22) Filed: Jun. 18, 1999

(30) Foreign Application Priority Data

Jun. 18, 1998 (FR) .................................................. 98 07682

(51) Int. Cl.$^7$ ....................................................... G01C 3/08
(52) U.S. Cl. ........................................ 356/4.09; 356/28.5
(58) Field of Search ................... 356/4.09, 5.1, 356/28.5

(56) References Cited

U.S. PATENT DOCUMENTS

| | | |
|---|---|---|
| 5,216,477 | 6/1993 | Korb . |
| 5,446,280 | 8/1995 | Wang et al. . |
| 5,790,242 | * 8/1998 | Stern et al. ........................ 356/4.04 |
| 5,905,576 | * 5/1999 | Takada et al. ...................... 356/373 |

OTHER PUBLICATIONS

Fischer K.W. et al.: "Visible Wavelength Doppler Lidar for Measurement of Wind and Aerosol Profiles During Day and Night Optical Engineering", Feb. 1, 1995, vol;. 34, No. 2, pp. 499–511—XPOOO490738.

Korb C.L., et al.: "Edge Technique Doppler Lidar Wind Measurements with High Vertical Resolution Applied Optics", Aug. 20, 1997, vol. 36, No. 24, pp. 5976–5983, XP000699715.

Ishii S. et al.: "Optical Fiber Coupled Multitelescope Lidar System: Application for a Rayleigh Lidar", Review of Scientific Instruments, Sep. 9, 1996, vol. 67, No. 9, pp. 3270–3273, XP000627215.

Garnier A. et al.: "Description of a Doppler Rayleigh Lidar for Measuring Winds in the Middle Atmosphere", Applied Physics B. Photophysics and Chemistry, Jul. 1, 1992, vol. B55, No. 1, pp. 35–40, XP000311968.

* cited by examiner

*Primary Examiner*—Stephen C. Buczinski
(74) *Attorney, Agent, or Firm*—Sughrue, Mion, Zinn, Macpeak & Seas, PLLC

(57) ABSTRACT

The invention relates to an incoherent Doppler laser detection and ranging system of the Lidar type comprising an emission laser and a receiver device including at least one telescope, an edge filter, and processor means responsive to the power $P_T$ transmitted by the filter. The processor means has data inputs relating to the power $P_T$ and to the power $P_R$ and outputs a normalized signal $\Delta P_N$, where:

$$\Delta P_N = \frac{P_T - P_R}{P_T + P_R}$$

$P_R$ designating the power reflected by the edge filter.

14 Claims, 2 Drawing Sheets

INCOHERENT DOPPLER LASER DETECTION AND RANGING SYSTEM

BACKGROUND OF THE INVENTION

In conventional manner, such apparatus comprises an emission laser and a receiver that includes an edge filter together with means for processing on the basis of the power $P_T$ transmitted through the filter. One particular known use lies in incoherent Doppler wind Lidar (IDWL) for detecting wind.

Incoherent Lidar type systems suffer from technical problems associated with:

- the low level of power received which is due specifically to the size of the receive telescope, with the upper limit on said size being determined by considerations of mass and expense, and correspondingly by effective use of the power received;
- the alignment constraints on the numerous solid components as required by conventional systems; and
- constraints on the mechanical stability of such equipment, in particular when on board a satellite.

In the particular case of an IDWL type Lidar, two additional problems can arise:

- the effect of the return signal being subject to dispersion in the atmosphere, known as "speckle"; and
- the various spectral characteristics of backscattering by aerosols and by molecules.

IDWL type Lidar systems measure the frequency displacement to which laser radiation backscattered by the atmosphere is subjected, and it does so by means of frequency-selective means which process the backscattered optical signal prior to detection. The differences between the various IDWL type Lidar systems lie essentially in the nature of the frequency-selective means.

It is known to use a frequency discriminator that associates a Fabry-Perot etalon (FPE) and an edge filter. Such a system is described in particular: in the article by C. L. Korb, B. M. Gentry, and C. Y. Weng, entitled "Edge technique: theory and application to Lidar measurement of atmospheric wind", published in Applied Optics No. 31, 1992, pp. 4202–4213; in U.S. Pat. No. 5,216,477 (Korb); and in the article by B. M. Gentry and C. L. Korb entitled "Edge technique for high-accuracy Doppler velocimetry", published in Applied Optics No. 33, 1994, pp. 5770–5777.

In that edge filter technique or "edge technique", a shift in the frequency of the backscattered laser radiation is converted into a variation in the amplitude of the light that passes through the Fabry-Perot interferometer.

That technique suffers from the drawback of using only a portion of the backscattered power that it receives, and in addition, another portion of said received power is used for normalizing the signal. Unfortunately, as mentioned above, the power received is limited by the size of the receiving telescope.

It has been suggested that this power can be increased by replacing a single telescope which is heavy and expensive with a plurality of smaller telescopes that are lighter and less expensive. Reference can be made in particular to the article by S. Ishii et al., entitled "Optical fiber coupled multi-telescope Lidar system: application for a Rayleigh Lidar", published in "Review of Scientific Instruments", No. 67, 1996, pp. 3270–3273. However, the amount of power received remains quite low and the problem of optimizing use of the received power remains and no solution is found for it.

In known systems which incorporate an edge filter, it will be observed that the photodetection devices implement PIN diodes, avalanche photodiodes (APD), or indeed photomultiplier tubes.

OBJECTS AND SUMMARY OF THE INVENTION

An object of the present invention is to provide a Lidar type incoherent laser telescope system that enables better use to be made of the power that is received.

The invention thus provides an incoherent Doppler laser detection and ranging system of the Lidar type comprising an emission laser and a receiver device including at least one telescope, an edge filter, and processor means responsive to the power $P_T$ transmitted by the filter, wherein the processor means has data inputs relating to the power $P_T$ and to the power $P_R$ and outputs a normalized signal $\Delta P_N$, where:

$$\Delta P_N = \frac{P_T - P_R}{P_T + P_R}$$

$P_R$ designating the power reflected by the edge filter.

In the system the processor means comprise first detector means for generating a current $i_T$ corresponding to the power $P_T$ and second detector means for generating a current $i_R$ corresponding to the power $P_R$, and:

$$\Delta P_N = \Delta i_N = \frac{i_T - i_R}{i_T + i_R}$$

It is particularly advantageous for the receiver device to comprise an array of N individual telescopes.

In which case, the receiver device can comprise N branches, each of which has an optical fiber, each of which is coupled to the outlet of one of said N individual telescopes.

In a first variant, the optical fibers are monomode, and each branch includes an optical circulator each having a first outlet applied to an edge filter with a transmission outlet, and each having a second outlet constituting a reflection outlet. The transmission outlet of each edge filter can then be coupled to one of the N inlets of a first photodetector which outputs a current $i_T$ proportional to the transmitted power $P_T$, and the second outlet of each optical circulator can be applied to one of the N inlets of a second photodetector which outputs a current $i_R$ proportional to the reflected power $P_R$. Each branch may include a prefilter for filtering at least the molecular component of backscattering, the filter being disposed upstream from the corresponding optical circulator. It is preferable for each of the first and second photodetectors to include such a prefilter, thereby making it possible to implement only two filters, instead of N filters.

In a preferred embodiment of this variant, the transmission outlet of each of the edge filters is coupled to one of the N inlets of the optical scanner device which has N' outlets applied to N' inlets of a charge coupled device outputting a current $i_T$ proportional to the transmitted power $P_T$, and the second outlet of each of the circulators is coupled to one of the N inlets of an optical scanner device which has N' outlets applied to N' inlets of a charge coupled device outputting at least one current $i_R$ proportional to the reflected power $P_R$.

In a preferred variant, said monomode or multimode fibers are coupled to the inlet of a multimode optical fiber.

The outlet of the multimode optical fiber can then be coupled to a common optical circulator having both a first outlet applied to a common edge filter with a transmission outlet, and a second outlet which constitutes a reflection outlet. In a first embodiment, said transmission outlet is coupled to one of the N inlets of a third photodetector which outputs a current $i_T$ proportional to the transmitted power $P_T$, and said second outlet of the optical circulator is applied to one of N inlets of a fourth photodetector which outputs a current $i_R$ proportional to the reflected power $P_R$. Each of the third and fourth photodetectors can include a prefilter for filtering the backscattered molecular component. In a second embodiment, the transmission outlet of the edge filter is coupled to an optical scanner device which has N' outlets applied to N' inlets of a charge coupled device outputting a current $i_T$ proportional to the transmitted power $P_T$, and the second outlet of said circulator is coupled to an optical scanner device having N' outlets applied to N' inlets of a charge coupled device outputting at least a current $i_R$ proportional to the reflected power $P_R$.

BRIEF DESCRIPTION OF THE DRAWINGS

Other characteristics and advantages of the invention will appear more clearly on reading the following description given by way of non-limiting example with reference to the accompanying drawings, in which.

MORE DETAILED DESCRIPTION

Figure 1A:
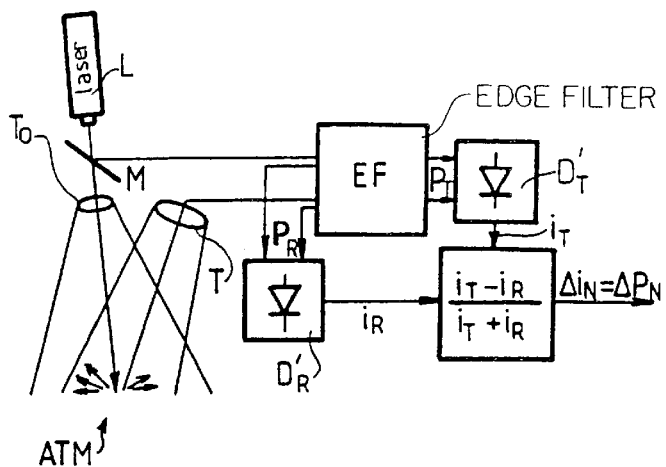
FIG. 1a shows a laser detection and ranging system of the invention, with the principles on which it is based being shown in FIG. 1b.

In FIG. 1a, a laser beam emitted by a laser L through a telescope $T_0$ of given area is backscattered by the atmosphere ATM. The return signal is received by a single telescope T or by a plurality of individual telescopes corresponding to a given receptive aperture. The received optical signal is applied to an edge filter EF which can be of the Fabry-Perot interferometer type, or of some other type. A fraction of each emitted laser pulse is, optionally, also applied to the inlet of the filter EF via an optical system including a partially reflecting mirror M. The power $P_T$ transmitted through the filter EF, and the power $P_R$ reflected by the filter are both detected by respective detectors $D_T$ and $D_R$, giving rise to respective currents $i_T$ and $i_R$. A signal processor SPD deduces therefrom the value $\Delta i_N$ using the equation:

$$\Delta i_N = (i_T - i_R)/(i_T + i_R)$$

so as to generate a normalized differential current $\Delta i_N, R_x$ representing the backscattered signal, and given that the same operation can be performed on a small fraction of the emitted laser pulse, it also gives the normalized differential current $\Delta i_N, T_x$ for the transmitted signal. The normalized differential current is on average equal to the normalized differential power, i.e.:

$$\Delta i_N = \Delta P_N = (P_T - P_R)/(P_T + P_R)$$

Figure 1B:
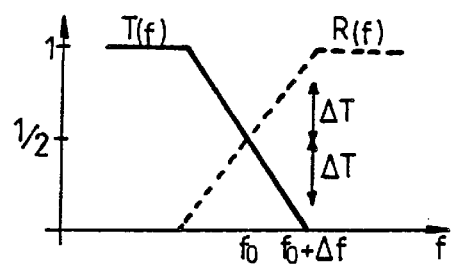

The advantages of implementing this calculation are explained below with reference to FIG. 1b. If the laser beam L, centered on a frequency $f_0$ is offset by the Doppler effect through a frequency difference $\Delta f$, the power $T(f)$ transmitted through the edge filter EF drops by $\Delta T$, while the power $R(f)$ reflected by the filter EF increases by $\Delta T$, assuming that the filter is lossless, i.e. that $T(f)+R(f)=1$. The subtraction operation performed in the nominator then serves to double the value of the result obtained ($\Delta P_N = 2\Delta T$), compared with the conventional technique where only the transmitted power is taken into account.

In addition, and unlike the technique described in the above-mentioned article by C. L. Korb, B. M. Gentry, and C. Y. Weng, there is no need to separate the input signal to normalize it, which means that all of the received power can be used for direct conversion into a signal $\Delta i_N$ that bears information.

The first embodiment of the invention, described below with reference to FIG. 2, makes use of monomode fibers. It uses N individual telescopes $ST_1, \ldots, ST_N$ whose outlets are coupled to a corresponding number of monomode fibers $SMF_1, \ldots, SMF_N$. Downstream, the apparatus is based on optical fibers and includes optical prefilters $F_1, \ldots, F_N$ for eliminating the background noise due to radiation and for attenuating undesirable backscattered molecular components. A description of such a filter can be found in the article by K. W. Fischer entitled "Visible wavelength Doppler Lidar for measurement of wind and aerosol profiles during day and night", published Optical Engineering No. 34, 1995, pp. 499–511. Provision can also be made for couplers $C_1, \ldots, C_N$ for enabling a fraction of the power $P_{TX}$ as emitted directly by the laser L to be introduced into the apparatus. This is required for the reference measurement only when the edge filter cannot be locked on the laser frequency.

N circulators $CIR_1, \ldots, CIR_N$ feed N edge filters $EF_1, \ldots, EF_N$ which perform the desired frequency discrimination. The sum of the radiation powers transmitted by the filters $EF_1, \ldots, EF_N$ in the N branches is detected by a photodiode $PHD_T$ which delivers the current $i_T$, while the sum of the powers reflected by the filters $EF_1, \ldots, EF_N$ as to be found on the other outputs of the circulators $CIR_1, \ldots, CIR_N$, is detected by a photodiode $PHD_R$ which generates the current $i_R$. A calculation module MOD calculates $$\Delta i_N = \Delta P_N = (i_T - i_R)/(i_T + i_R).$$

The photodiodes $PHD_T$ and $PHD_R$ can be of the avalanche type. They can also be of the PIN type, in combination with optical fiber amplifiers $G_1, \ldots, G_N$ for each of the N branches. It will be observed that the prefilters F can be located in positions other than those shown, providing they are not disposed between the circulators CIR and the edge filters EF, given that that would generate unforeseeable attenuation concerning the light reflected and transmitted in the N branches, assuming that the prefilters F are subject to random frequency drift, and the end result would be to confer a random nature to the normalization function. There can be two prefilters F, each disposed upstream from a respective one of the detectors $PHD_T$ and $PHD_R$.

If the optical power coupled to the ith one of the N branches is written $P_i$, then:

$$\Delta i_N = \frac{\sum_{i=1}^{N} P_i [T_i(f) - R_i(f)]}{\sum_{i=1}^{N} P_i [T_i(f) + R_i(f)]} = 2T(f) - 1$$

assuming that $T_i(f) = T_j(f) = T(f)$, regardless of i and j.

If account is taken of stochastic powers $\Pi_i$, given the dispersion phenomena known as "speckle" that give rise to statistical variations in power, it can be shown that the influence of these phenomena needs to be taken into account only insofar as $T_i(f) \neq T_j(f)$, which means that the relationship:

$$Di_N = 2T(f) - 1$$

remains satisfactory, or in other words that statistical variations are fully compensated, which constitutes a significant advantage of the basic concept of using a plurality of individual telescopes.

Figure 3:
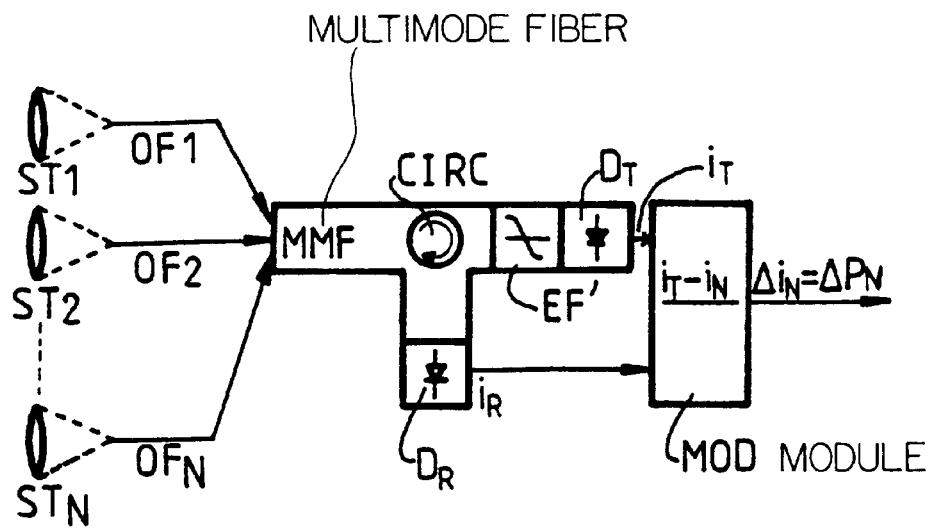
FIG. 3 shows a preferred, second embodiment of the invention, implementing multimode fibers.

FIG. 3 shows an architecture comprising coupling between monomode or multimode fibers $OF_1, \ldots, OF_N$ coupled to the outlet of individual telescopes $ST_1, ST_2, \ldots, ST_N$ and a multimode fiber MMF. The multimode fiber MMF performs a mode mixing function, on which topic reference can be made to the teaching of the article by Z. Liu and T. Kobayashi entitled "Incoherent Doppler Lidar system using differential discrimination technique for tropospheric wind measurement", published in "Advances in Atmospheric Remote Sensing with Lidar", by A. Ansmann (ed.) Springer 1996. The prefilters $F_1, \ldots, F_N$ (not shown in FIG. 3) are also implemented in order to eliminate radiation background noise and/or to attenuate molecular background noise. The prefilters can be located in the monomode fibers $OF_1, \ldots, OF_N$, or merely immediately upstream from the detectors $D'_T$ and $D'_R$. The circuit of FIG. 3 implements a single edge filter EF' and a single circulator CIRC for feeding the detectors $D'_T$ and $D'_R$ which in turn generate the currents $i_T$ and $i_R$ which are applied to the module MOD. The radiation transmitted by the filter EF' is detected by the photo-detector $D'_T$ while the power reflected thereby is applied to the photodiode $D'_R$ via the circulator CIRC. It is also possible to couple a portion of the light emitted by the laser L for the purpose of supplying a reference measurement at any point situated upstream from the circulator CIRC, assuming that it is not possible to lock the frequency of the edge filter EF' on the frequency of the laser L. The filter EF' provides frequency discrimination.

Figure 2:
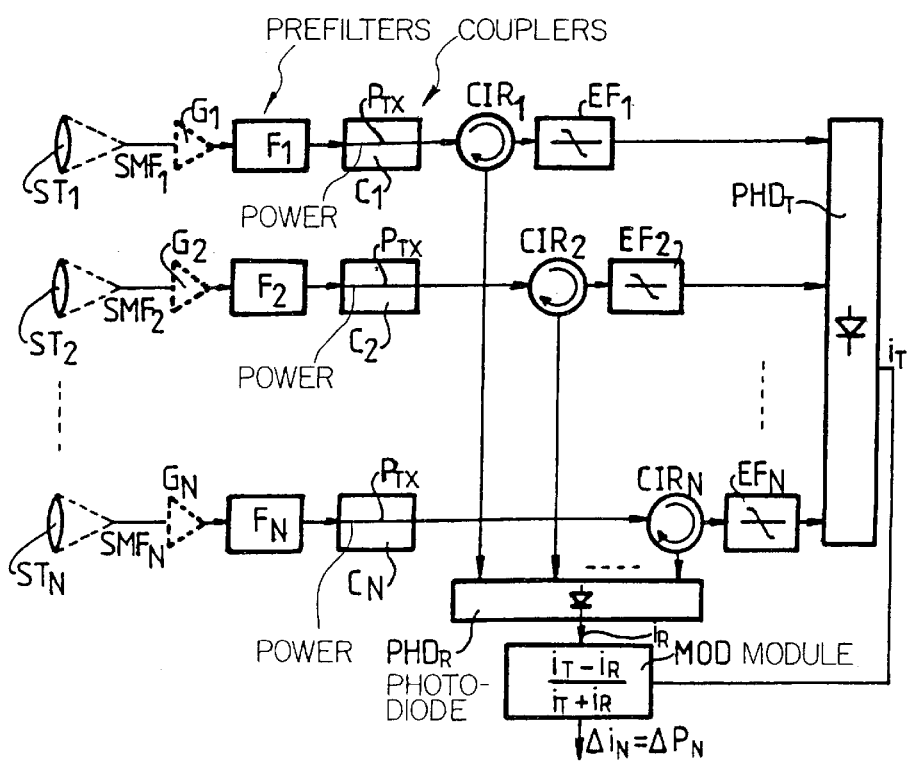
FIG. 2 shows a first embodiment of the invention, implementing monomode optical fibers.

The signals are processed in the same manner as in FIG. 2, and the properties of compensating statistical variation or "speckle" are likewise conserved.

Figure 4:
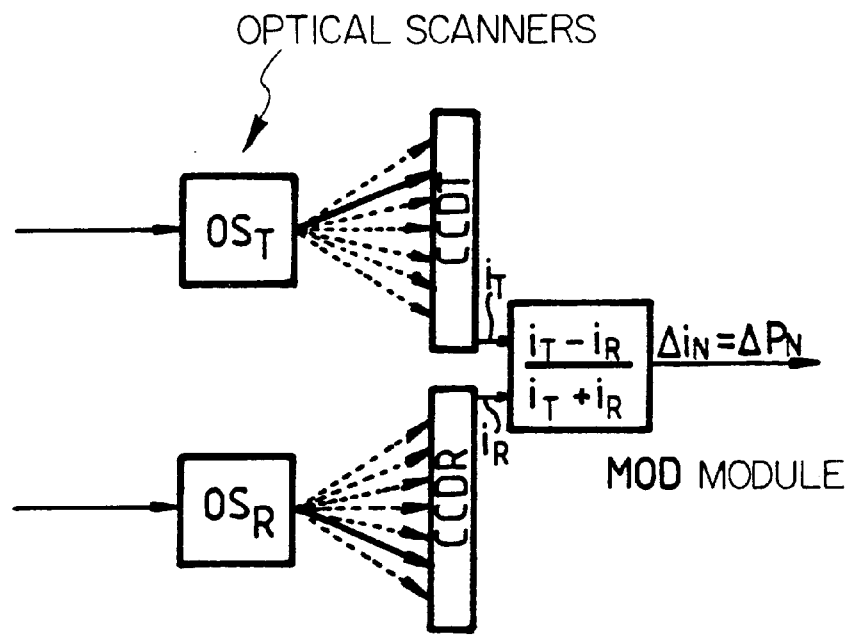
FIG. 4 shows a variant embodiment of the invention implementing charge coupled devices.

FIG. 4 shows a variant of the invention implementing charge coupled devices that are fed by scanning. The scanning is performed by optical scanner devices $OS_T$ and $OS_R$ allocated respectively to the signals as transmitted and as reflected by the edge filters. In the case shown in FIG. 2 (monomode fibers), the device $OS_T$ receives the signals as transmitted by the filters $EF_1, \ldots, EF_N$ on its N inlets, while the device $OS_R$ receives the signals as reflected by the filters $EF_1, \ldots, EF_1$, via the circulators $CIR_1, \ldots, CIR_N$. In the case of FIG. 3, the circuit $OS_T$ receives on its inlet the signal transmitted by the filter EF', while the circuit $OS_R$ receives on its inlet the signal reflected by the filter $EF_N$, said signal passing via the circulator CIRC.

The outlet of the circuit $OS_T$ is coupled successively to the N' inlets of a charge coupled device CCDT. The outlet of the circuit $OS_R$ is coupled successively to the N' inlets of a charge coupled device CCDR. Scanning can be performed mechanically, electrooptically, acousto-optically, etc. As a result, each of the N' memory elements of the devices CCDT and CCDR stores information elating to a given time interval corresponding to a layer of the atmosphere.

By reading the devices CCDT and CCDR sequentially, and summing, it is possible to recover the currents $i_T$ and $i_R$ and to deduce therefrom the currents $\Delta i_N$ with the help of the module MOD. This system makes it possible to obtain both the advantage of low noise because of detection performed with the help of a charge coupled detector, and the possibility of operating sequentially on a point by point basis in effective manner, so as to process the power backscattered by different layers of the atmosphere.

The reflected echoes of pulses emitted by the laser bear information (wind speed) relating to various altitudes. Each pulse is of a duration that is typically of the order of a few tens of microseconds, each microsecond of the echo signal corresponding to a layer of the atmosphere that is about 150 meters (m) thick. To measure the atmospheric profile of the wind, the received echo must be sampled in time. By means of the scanner devices ($OS_T$, $OS_R$) disposed upstream from the detector array CCDT and CCDR which store information in a charge coupled device as a function of delay, the spatial distribution of the stored electric charges corresponds to the signals backscattered by different layers of the atmosphere, the thickness of each of the N' sampled layers being a function of the scanning rate of the devices $OS_T$ and $OS_R$.

The currents $i_T$ and $i_R$ are calculated for each of N' corresponding positions of the charge coupled sensors so as to obtain information for each layer of the atmosphere and deduce the corresponding value of $\Delta i_N$ therefrom. Overall summing as shown in FIG. 4 gives the currents $i_T$ and $i_R$ corresponding to the cases of FIGS. 1 and 3, without making any selection as a function of a layer of the atmosphere.

It is possible to accumulate in the CCD sensors echo signals coming from a desired number of pulses prior to reading the accumulated charge signals.

By accumulating signals in the detectors prior to reading them, electronic background noise makes only a small contribution to read error, as compared with a system having a single detector that is sampled in time and that delivers its background noise contribution on each occasion.

What is claimed is:

1. An incoherent Doppler laser detection and ranging system of the Lidar type comprising an emission laser and a receiver device including at least one telescope, an edge filter, and processor means responsive to the power $P_T$ transmitted by the filter, wherein the processor means has data inputs relating to the power $P_T$ and to the power $P_R$ and outputs a normalized signal $\Delta P_N$, where:

$$\Delta P_N = \frac{P_T - P_R}{P_T + P_R}$$

$P_R$ designating the power reflected by the edge filter.

2. A system according to claim 1, wherein the processor means comprise first detector means for generating a current $i_T$ corresponding to the power $P_T$ and second detector means for generating a current $i_R$ corresponding to the power $P_R$, and wherein:

$$\Delta P_N = \Delta i_N = \frac{i_T - i_R}{i_T + i_R}$$

3. A telescope according to claim 1, wherein the receiver device comprises an array of N individual telescopes.

4. A telescope according to claim 3, wherein the receiver device comprises N branches, each which has an optical fiber, each of which is coupled to the outlet of one of said N individual telescopes.

5. A telescope according to claim 4, wherein the optical fibers are monomode, and wherein each branch includes an optical circulator each having a first outlet applied to an edge filter with a transmission outlet, and each having a second outlet constituting a reflection outlet.

6. A telescope according to claim 5, wherein the transmission outlet of each edge filter is coupled to one of the N inlets of a first photodetector which outputs a current $i_T$ proportional to the transmitted power $P_T$, and wherein the second outlet of each optical circulator is applied to one of the N inlets of a second photodetector which outputs a current $i_R$ proportional to the reflected power $P_R$.

7. A telescope according to claim 5, wherein each branch has a prefilter for filtering at least the molecular component of backscattering, the filter being disposed upstream from said optical circulator.

8. A telescope according to claim 6, wherein each of the first and second photodetectors includes a prefilter for filtering the molecular component of backscattering.

9. A telescope according to claim 4, wherein each of said monomode or multimode optical fibers is coupled to the inlet of a multimode optical fiber.

10. A telescope according to claim 9, wherein the outlet of the multimode optical fiber is coupled to a common optical circulator having a first outlet applied to an edge filter with a transmission outlet, and having a second outlet constituting a reflection outlet.

11. A telescope according to claim 10, wherein said transmission outlet is coupled to one of the N inlets of a third photodetector which outputs a current $i_T$ proportional to the transmitted power $P_T$, and wherein said second outlet of the optical circulator is applied to one of the N inlets of a fourth photodetector which outputs a current $i_R$ proportional to the reflected power $P_R$.

12. A telescope according to claim 11, wherein each of the third and fourth photodetect includes a prefilter for filtering at least the molecular component of backscattering.

13. A telescope according to claim 10, wherein the transmission outlet of the edge filter is coupled to a first optical scanning device having N' outlets applied to N' inlets of a first charge coupled device outputting a current $i_T$ proportional to the transmitted power $P_T$, and wherein the second outlet of said circulator is coupled to a second optical scanning device having N' outlets applied to N' inlets of a second charge coupled device outputting at least a current $i_R$ proportional to the reflected power $P_R$.

14. A telescope according to claim 5, wherein the transmission outlet of each edge filter is coupled to one of the N inlets of a third optical scanner device having N' outlets applied to a N' inlets of a third charge coupled device outputting a current $i_T$ proportional to the transmitted power $P_T$, and wherein the second outlet of each of the circulators is coupled to a respective one of the N inlets of a fourth optical scanner device which has N' outlets applied to N' inlets of a fourth charge coupled device outputting at least a current $i_R$ proportional to the reflected power $P_R$.

* * * * *